United States Patent
Ge et al.

(10) Patent No.: US 8,665,887 B2
(45) Date of Patent: Mar. 4, 2014

(54) NUMBER AUTOMATIC ROUTING METHOD, UPDATING METHOD, WITHDRAWING METHOD, ROUTER AND DEVICE

(75) Inventors: Shu Ge, Beijing (CN); Jinxia Sun, Beijing (CN); Meng You, Beijing (CN); Wei Li, Beijing (CN); Wei Li, Beijing (CN); Yutian Nie, Beijing (CN); Yue Li, Beijing (CN); Lihong Wei, Beijing (CN); Sitao Lin, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 91 days.

(21) Appl. No.: 13/059,934

(22) PCT Filed: Jul. 29, 2009

(86) PCT No.: PCT/CN2009/000846
§ 371 (c)(1),
(2), (4) Date: Aug. 8, 2011

(87) PCT Pub. No.: WO2010/020107
PCT Pub. Date: Feb. 25, 2010

(65) Prior Publication Data
US 2011/0286466 A1 Nov. 24, 2011

(30) Foreign Application Priority Data
Aug. 21, 2008 (CN) .......................... 2008 1 0118760

(51) Int. Cl.
H04L 12/28 (2006.01)
(52) U.S. Cl.
USPC .......................................... 370/401; 713/153
(58) Field of Classification Search
USPC .......................................... 370/401; 713/153
See application file for complete search history.

(56) References Cited

U.S. PATENT DOCUMENTS

| | | | | |
|---|---|---|---|---|
| 7,925,778 | B1 * | 4/2011 | Wijnands et al. | 709/238 |
| 2006/0092940 | A1 * | 5/2006 | Ansari et al. | 370/392 |
| 2006/0291445 | A1 | 12/2006 | Martini et al. | |
| 2008/0056207 | A1 * | 3/2008 | Eriksson et al. | 370/338 |
| 2008/0101392 | A1 * | 5/2008 | Zhang et al. | 370/401 |
| 2008/0229095 | A1 * | 9/2008 | Kalimuthu et al. | 713/153 |

FOREIGN PATENT DOCUMENTS

| | | |
|---|---|---|
| CN | 1949776 A | 4/2007 |
| CN | 1972295 A | 5/2007 |
| CN | 101040487 A | 9/2007 |
| CN | 101052207 A | 10/2007 |
| CN | 101155119 A | 4/2008 |
| CN | 101340372 A | 1/2009 |

OTHER PUBLICATIONS

International Search Report issued for PCT/CN2009/000486, dated Nov. 12, 2009, 5 pages.

* cited by examiner

*Primary Examiner* — Wei Zhao
(74) *Attorney, Agent, or Firm* — Fulbridght & Jaworski LLP (57) ABSTRACT

A number automatic routing method, an updating method, a withdrawing method, a router and a device is provided wherein the number automatic routing method includes: converting to-be-distributed number into number routing information to add to dynamic routing protocol; generating a dynamic routing protocol message according to the number routing information; transmitting the dynamic routing protocol message through an Internet Protocol (IP) network and distributing the number through the dynamic routing protocol message and the IP network. The method supports automatic routing of numbers such as E.164 and E.214 and SP through expanding current Multi-Protocol Border Gateway Protocol (MP-BGP) that optimizes network structure and improves efficiency.

18 Claims, 5 Drawing Sheets

NUMBER AUTOMATIC ROUTING METHOD, UPDATING METHOD, WITHDRAWING METHOD, ROUTER AND DEVICE

CROSS REFERENCE TO RELATED APPLICATIONS

The present application is a US National Stage of International Application No. PCT/CN2009/000846, filed 29 Jul. 2009, designating the United States, and claiming priority to Chinese Patent Application No. 200810118760.7 filed 21 Aug. 2008, the disclosures of which are incorporated herein by reference.

FIELD OF THE INVENTION

The present invention relates to the field of computer networks, particularly to an extended MP-BGP and more particularly to a number automatic routing method and router based upon the extended MP-BGP in a communication network.

BACKGROUND OF THE INVENTION

A traditional Border Gateway Protocol (simply BGP) defined in the standard of RFC1771, i.e., BGP-4, is only capable of managing route information in a network layer protocol IPv4 but is restricted in terms of propagation across autonomous systems in other network layer protocols, e.g., IPv6, IPX, L3VPN, etc.

(1) Extensions to the BGP-4

As extensions to the BGP-4, the IETF has published the standards of RFC2858 (Multi-protocol Extensions to the BGP-4) and RFC4760 in which a Multi-Protocol-BGP (simply MP-BGP) is defined. The MP-BGP is capable of supporting multiple network protocols, e.g., IPv6, IPX, L3VPN, etc, and is backward compatible, that is, an MP-BGP enabled router may work with a non MP-BGP enabled router.

Among messages used in the BGP-4, three pieces of IPv4 related information are carried in an UPDATE message, i.e., Network Layer Reachability Information (simply NLRI), NEXT-HOP attribute among path attributes (NEXT-HOP) and AGGREGATOR attribute among the path attributes (simply AGGREGATOR).

In an original system base upon the BGP-4 protocol, a path attribute is included in the UPDATE message regardless of whether route information forwarded in the UPDATE message includes the NLRI information or only withdrawn route information. For the MP-BGP, it is considered that next-hop information (provided in the NEXT-HOP attribute) makes sense only when a destination address is reachable or otherwise makes no sense when a destination address is unreachable (i.e., withdrawn). Therefore, an announcement of destination reachability information shall be associated with that of the next-hop information related thereto and isolated from that of the route withdrawn information.

In order to support multiple protocols at the network layer, the BGP-4 shall reflect information of the protocols at the network layer into the NLRI and the NEXT-HOP. The MP-BGP in the RFC2858 has defined two new path attributes, i.e., a Multi-protocol Reachable NLRI (simply MP_REACH_NLRI) attribute and a Multi-protocol Unreachable NLRI (simply MP_UNREACH_NLRI) attribute respectively.

The MP_REACH_NLRI attribute is configured to carry a set of reachable destination information and next-hop information providing forwarding of the reachable destination information.

The MP_UNREACH_NLRI attribute is configured to carry a set of unreachable destination information.

Both of the attributes are optional non-transitive. If a BGP speaker is not capable of supporting multiple protocols, then information with these attributes is simply ignored and will not be passed to another BGP speaker.

The MP_REACH_NLRI attribute, the MP_UNREACH_NLRI attribute, an NLRI encoding process, an error process and the use of a BGP capability advertisement involved in the MP-BGP are detailed below.

(11) The MP_REACH_NLRI attribute is of a type code 14 and is an optional non-transitive attribute used in the following scenarios that: (a) an available route is announced to a neighbor; (b) a router is allowed to announce its network layer address which, like next-hop information, is configured to indicate a destination listed in the field of network layer reachability information of the MP_NLRI attribute. Encoding structures of the MP_REACH_NLRI attribute is illustrated as in FIG. 1. The usages and meanings of respective fields are as follows.

Figure 1:
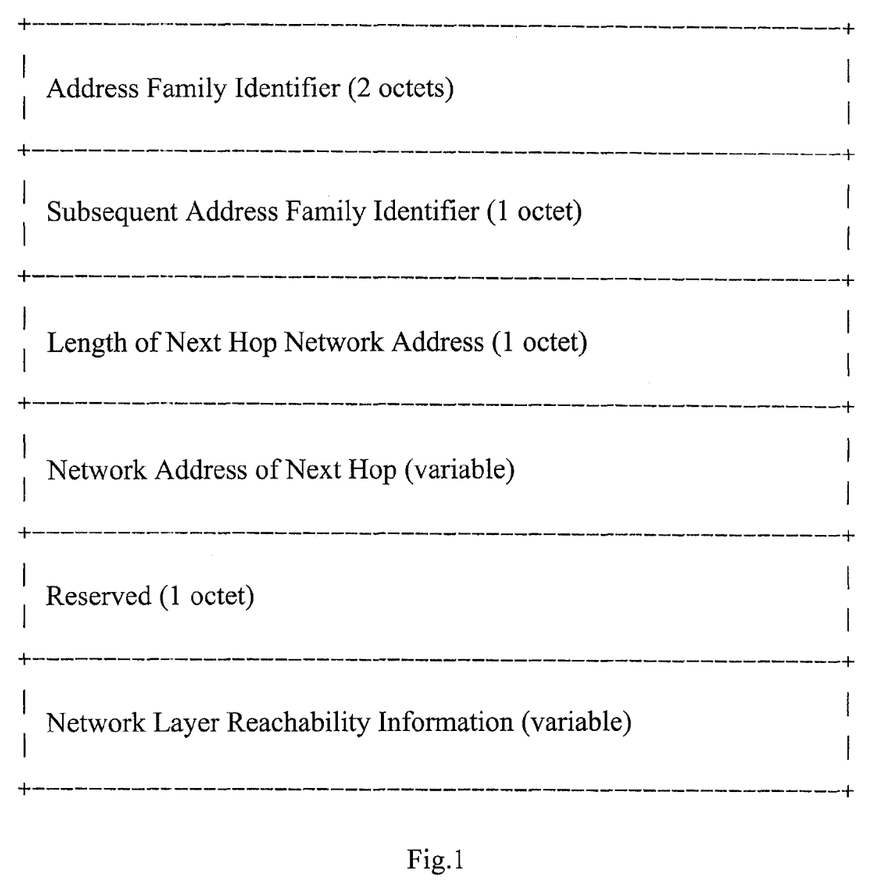
FIG. 1 illustrates a schematic diagram of encoding of the MP_REACH_NLRI attribute in the MP-BGP in the prior art.

The Address Family Identifier (simply AFI): this field carries the identifier of a connection of a network layer protocol with a network address. The MP-BGP distinguishes different network layer protocols with an address family. With reference to values taken by the address family, reference may be made to the RFC 1700 (see the section of Address Family Numbers). At present, various extended MP-BGP applications have been achieved in a system, including an extension to the IPv6, an extension to the IPX, an extension to the Framework for a Layer 3 Virtual Private network (simply L3VPN), etc., and the different extended applications are configured in their own address family views.

The Subsequent Address Family Identifier (simply SAFI): this field carries supplementary information of the type of Network Layer Reachability Information (NLRI) included in the attribute.

The Length of a Next Hop Network Address: a one-byte field of next-hop address length indicates the length of a next-hop address.

The network Address of Next Hop: this field is variable in length and includes the address of a next router to a destination system.

The network Layer Reachability Information (simply NLRI): this field is variable in length and lists NLRI information of an available route to be announced in the present attribute. When the SAFI is set to be a certain value defined in the standard of RFC4760, all of the NLRI will be subject to an encoding process as specified in the "NLRI encoding".

Since the MP_REACH_NLRI attribute includes the next-hop information (e.g., the Length of the Next Hop Network Address, the Network Address of the Next Hop, etc.) and the NLRI, the NLRI and the NEXT-HOP attribute in the BGP-4 protocol are not carried directly in the UPDATE message with the MP_REACH_NLRI attribute any longer. If the UPDATE message received in an MP-BGP protocol enabled router includes directly the NEXT-HOP attribute, then the router shall ignore the UPDATE message.

(12) The MP_UNREACH_NLRI attribute is of a type code 15 and is an optional non-transitive attribute used in a scenario where multiple unavailable routes are withdrawn. Encoding structures of the MP_UNREACH_NLRI attribute is illustrated as in FIG. 2. The usages and meanings of respective fields are as follows.

Figure 2:
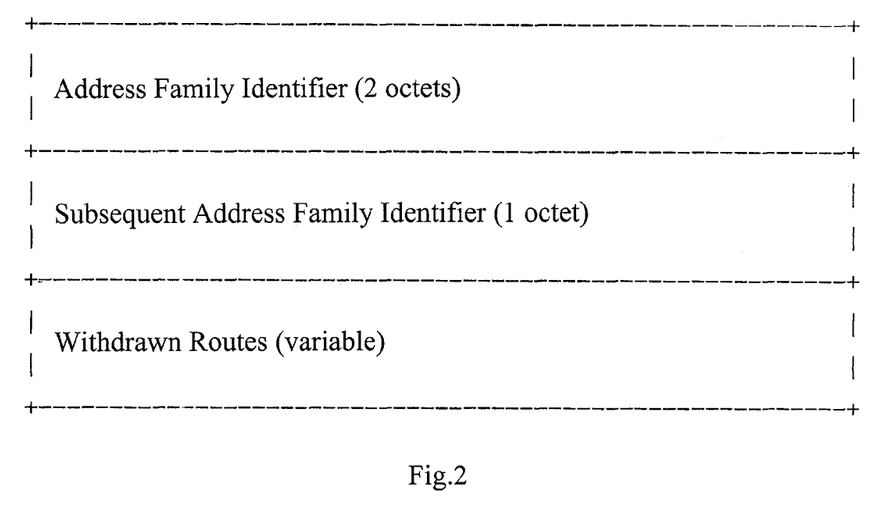
FIG. 2 illustrates a schematic diagram of encoding of the MP_UNEACH_NLRI attribute in the MP-BGP in the prior art.

The Address Family Identifier (simply AFI): this field carries the identifier of a network layer protocol related to lower NLRI. At present, this field has a defined value as specified in the RFC1700 (see the section of Address Family Numbers).

The Subsequent Address Family Identifier (simply SAFI): this field carries supplementary information of the type of Network Layer Reachability Information (NLRI) included in the attribute.

The Withdrawn Routes: this field is variable in length and lists NLRI of a route to be withdrawn from a service. When the SAFI is set to be a certain value defined in the RFC4760, each piece of NLRI is subject to an encoding process as specified in the section of "NLRI encoding".

The UPDATE message with the MP_UNREACH_NLRI attribute is not necessarily carry another patch attribute.

Figure 3:
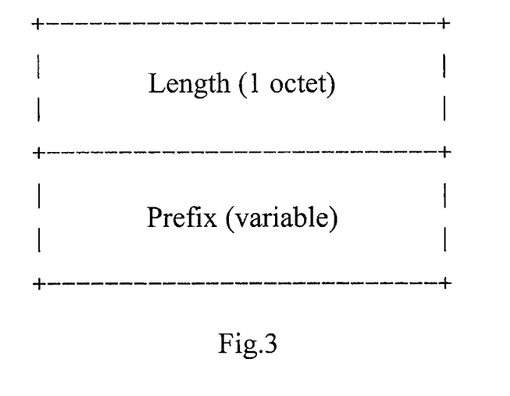
FIG. 3 illustrates a schematic diagram of encoding of NLRI in the MP-BGP in the prior art.

(13) The NLRI encoding process: the network layer reachability information is encoded into one or several sets of two elements similarly as illustrated in FIG. 3. The usages and meanings of respective fields are as follows.

The Length: this field indicates the length of an address prefix in bit. If it is all zero, then this indicates a match to any address.

The Prefix: this field includes an address prefix which is supplemented in bit to a full byte(s) without influencing any true value of the prefix.

(14) The error process: if a BGP speaker receives an UPDATE message with the MP_REACH_NLRI or MP_UNREACH_NLRI attribute from a neighbor and determines that the MP_REACH_NLRI or MP_UNREACH_NLRI attribute in the UPDATE message is incorrect, then the BGP speaker removes all of BGP routes published from the neighbor; if the BGP speaker receives such an UPDATE message in a session duration, then the BGP speaker may ignore all incorrect AFI/SAFI subsequent routes received in the session; further, if the BGP speaker receives such an UPDATE message, then the BGP speaker may terminate a BGP session process. An error process message (e.g., the NOTIFICATION message, etc.) indicates an error code and an error sub-code respectively as "Update Message Error" and "Optional Attribute Error".

(15) The use of a BGP Capability Advertisement: an MP-BGP enabled BGP speaker shall use a capability advertisement process [BGP-CAP] to test whether the speaker can use a multi-protocol extension method with a specific peer. The capability optional parameter field is configured such that the Capability Code is set to be 1 (indicating a multi-protocol extension capability), the Capability Length is set to be 4, and the Capability value fields include the fields of "AFI", "Res." and "SAFI" in sequence.

The AFI field—an address family identifier (16 bits). Encoding way of the AFI field is the same way as that preset in a multi-protocol extension.

The RES. field—a reserved (8-bit) area. It shall be set by a transmitting party as 0 and ignored by a receiving party.

The SAFI field—a subsequent address family identifier (8 bits). Encoding way of the SAFI field is the same as that preset in a multi-protocol extension.

In order to exchange route information for two specific directions between a pair of BGP speakers, each of the BGP speakers shall announce its support for such a special route to the other one through a capability announcement mechanism.

(2) Overview of Extensions to the BGP/MPLS VPN

The standard of RFC2547bis defines a mechanism allowing a service provider to use its own IP backbone and to provide a customer with a Virtual Personal Network (VPN) service. The RFC 2547bis VPN is also referred to as the BGP/MPLS VPN because it uses the BGP to distribute VPN route information over the backbone of the provider and uses Multi-Protocol Label Switching (MPLS) to forward a VPN traffic from one site to another one.

(21) The Structure of an VPN-IPv4 Address

A VPN customer often manages its own network and uses an RFC 1918 private address space. If different VPN customers use the same private IPv4 address, then an address overlap may arise, thus resulting in the difficulty of BGP routing because the BGP assumes that each carried IPv4 address shall be globally unique. In order to address this issue, the BGP/MPLS VPN supports a mechanism through which a non-unique IP address is converted into a globally unique address by using a VPN-IPv4 address family and deploying an extension to the Multi-Protocol-BGP (MP-BGP).

A space of overlapping addresses proposes a challenge that if the traditional BGP sees two different routes for the same IPv4 address prefix (the prefix is assigned to systems in different VPNs), then the BGP will process the prefix as if there were only one route. As a result, there is a VPN system unreachable. In order to address this issue, a mechanism is required to allow the BGP to disambiguate the prefix so that two totally different routes to the address can be deployed, each for respective one of the VPNs. Such a function may be supported in the standard of RFC2547bis by defining a VPN-IPv4 address family.

A VPN-IPv4 address prefix is of 12 bytes in total and includes a 8-byte Route Distinguisher (simply RD) and a 4-byte IPv4 address prefix. A VPN-IPv4 address is structured as including:

a Type Field: 2 bytes; and
a Value Field: 6 bytes

The 8-byte RD is consisted of the 2-byte type field and the 6-byte value field. A value taken by the value field is dependent upon a value of the type field. At present, there are three values of 0, 1 and 2 defined for the type field.

A. When the type filed takes the value of 0, the value field is consisted of two sub-fields:

a manager sub-field: 2 bytes; and
an assigned number sub-field: 4 bytes.

The manager sub-field shall include an Autonomous System Number (ASN), and if this ASN is taken from a public ASN space, then it shall be assigned from an appropriate authority; and the assigned number sub-field includes a number taken from a number space managed by an enterprise to which the ASN specified in the manager sub-field has been assigned from the appropriate authority.

B. When the type filed takes the value of 1, the value field is also consisted of two sub-fields:

a manager sub-field: 4 bytes; and
an assigned number sub-field: 2 bytes.

The manager sub-field shall include an IP address, and if this IP address is taken from a public IP address space, then it shall be assigned from an appropriate authority; and the assigned number sub-field includes a number taken from a number space managed by an enterprise to which the IP address specified in the manager sub-field has been assigned.

C. When the type filed takes the value of 2, two sub-fields are structured as follows:

a manager sub-field: 4 bytes; and
an assigned number sub-field: 2 bytes.

The manager sub-field shall include a 4-byte BGP-AS4 number, and if this ASN is taken from a public ASN space, then it shall be assigned from an appropriate authority; and the assigned number sub-field includes a number taken from a number space managed by an enterprise to which the ASN specified in the manager sub-field has been assigned from the appropriate authority.

Such a structure of the RD ensure that a service provider providing a VPN backbone service can generate a unique RD, but such an RD per se makes no particular sense.

(22) Support of the MP-BGP for the VPN-IPv4

After Virtual Routing Forwarding (VRF) and a Label Switched path (LSP) are set up between PEs, the PEs announce route information respectively to their own BGP peers. When the route information is announced, firstly the IPv4 address prefix of a route is converted into the format of a VPN-IPv4 address prefix with an RD specified when VRF is configured. When the PE announces the route information to the BGP peer, each route (MP-BPG route) shall include the following contents:

1) the VPN-IPv4 address prefix of the route (a 8-byte RD plus a 4-byte IPv4 address prefix);

2) the IP address of the PE per se acts as an MP-BPG next-hop Label Switching Router (LSR) address of the route, and since the MP-BGP requires that next-hop LSR addresses be in the same address format, the MP-BPG next-hop LSR address is in the format of a VPN-IPv4 address with RD=0;

3) a label assigned from the PE to the route;

4) an export Route Target (RT) including VRF of the route, as a "COMMUNITY" attribute of the route; and 5) optionally, the attributes of ORIGIN and AS_PATH are included.

The structure of the VPN-IPv4 address prefix has been described above and is to be encapsulated in the NLRI field of the MP_REACH_NLRI after being encoded.

The NLRI is encoded as in the extended multi-protocol BGP, and the AFI field takes the value of 1 (because the network layer protocol associated with the NLRI is still the IP) to indicate that a VPN-IPv4 address is carried.

Also the MP-BPG route further carries a label which is assigned from a PE to the route and is alike encapsulated in the NLRI field, thereby improving the NLRI encoding format in the RFC2858 by being converted into a set of three elements in the format. As described in the RFC3107 (Carrying Label Information in BPG-4), one or more labels can be carried, each of which has a length of only 3 bytes including upper 20 bits carrying the value of the label and lower 4 bits with three ones being reserved and the last one (S bit) being set to be 1 to indicate arrival at the bottom of a stack of the label (the label here is encoded slightly differently from a standard MPLS label in that no TTL field is included).

When a label is carried in the MP-BPG, the SAFI field of the MP_REACH_NLRI is configured to indicate that the attribute carries "Label" information (the value of the SAFI is set to be 4).

Figure 4:
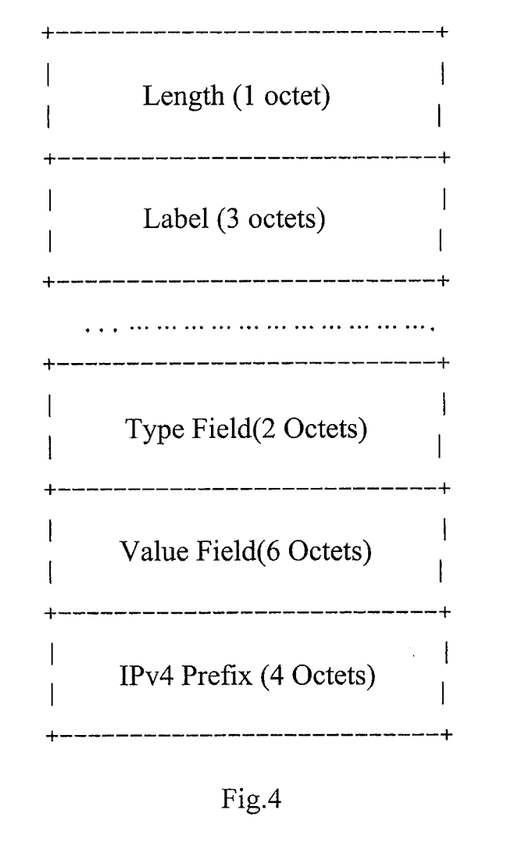
FIG. 4 illustrates a schematic diagram of encoding of NLRI for the VPN-IPv4 protocol in the MP-BGP in the prior art.

A PE may distribute all of routes present in VRF or may firstly aggregate all these routes and then distribute an aggregation route. Assumed that the PE has assigned a label L to a route R and distributed such a label mapping in the BGP, so when the route R is a route resulting from aggregation of routes in VRF, the PE has to determine how to forward a message by searching for corresponding VRF, where the message carries the label for determining and searching for VRF of the final route, and a label information library reflects the correspondence relationship between the label and VRF; and if R is not an aggregation route, then an export interface and a link layer package type of the message are shown directly in the label information library, and in this case, there is no need to search for VRF. The format of NLRI encoding in the existing VPN-IPv4 protocol is as illustrated in FIG. 4.

The existing MP-BPG protocol supports routing in the protocols of IPv6, IPX, L3VPN, etc., but does not support routing of an E.164 number segment, E.214, an SP code assigned from an enterprise per se, etc., thus failing to perform a function of automatic routing of an E.164, E.124 and SP number.

SUMMARY OF THE INVENTION

In view of the drawback in the prior art that the MP-BPG protocol does not support routing of an E.164 number segment, E.214, an SP code assigned from an enterprise, etc., thus failing to optimize the structure of a network, an object of an embodiment of the invention is to provide a number automatic routing method, updating method, withdrawing method, router and number router device to improve the existing MP-BGP, thereby performing automatic routing of a number while optimizing the structure of the network and improving the efficiency.

An embodiment of the invention provides a number automatic routing method including: converting a number to be distributed into number route information and adding the number route information into a dynamic routing protocol, wherein the dynamic routing protocol is a MultiProtocol-Border Gateway Protocol (MP-BGP) defined in standards of RFC2858 and RFC4760, and the number route information includes a corresponding relationship between the number to be distributed and a next-hop network address, and wherein the next-hop network address is an address of a router which hosts the number to be distributed; generating a message of the dynamic routing protocol from the number route information; and transmitting the message of the dynamic routing protocol over an IP network and distributing the number route information.

An embodiment of the invention further provides a route updating method including:

converting at a first router a number into number route information and adding the number route information into a dynamic routing protocol, wherein the dynamic routing protocol is a MultiProtocol-Border Gateway Protocol (MP-BGP) defined in standards of RFC2858 and RFC4760, and the number route information includes a corresponding relationship between the number and a next-hop network address, and wherein the next-hop network address is an address of a router which hosts the number;

transmitting at the first router a message of the dynamic routing protocol including the number route information over an IP network to a second router; and parsing at the second router the message of the dynamic routing protocol to retrieve the number route information and a route corresponding to the number.

An embodiment of the invention further provides a method for withdrawing a route including:

generating at a first router a withdrawn route message of a dynamic routing protocol including number route information, wherein the dynamic routing protocol is a MultiProtocol-Border Gateway Protocol (MP-BGP) defined in standards of RFC2858 and RFC4760, and the number rout information includes a corresponding relationship between a number and a next-hop network address, and wherein the next-hop network address is an address of a router which hosts the number;

transmitting at the first router the withdrawn route message over an IP network to a second router; and receiving and parsing at the second router the withdrawn route message to retrieve the number route information and removing the number route information from a route table in the second router.

An embodiment of the invention further provides a router including a storage medium storing a computer program, wherein the computer program is executed to implement: a configuration module configured to add number route information into a dynamic routing protocol, wherein the dynamic routing protocol is a MultiProtocol-Border Gateway Protocol (MP-BGP) defined in standards of RFC2858 and RFC4760, and the number route information includes a corresponding relationship between a number and a next-hop network address, and wherein the next-hop network address is an address of a router which hosts the number; a processing module configured to convert a number into number route information and to add the number route information into a message of the dynamic routing protocol; and a transmission module configured to transmit the message to a reflector.

An embodiment of the invention further provides a router including a storage medium storing a computer program, wherein the computer program is executed to implement: a reception module configured to receive a message of a dynamic routing protocol, wherein the dynamic routing protocol is a MultiProtocol-Border Gateway Protocol (MP-BGP) defined in standards of RFC2858 and RFC4760; a parsing module configured to parse a received message of the dynamic routing protocol to retrieve number route information and further a route of a number, wherein the number route information includes a corresponding relationship between the number and a next-hop network address, and wherein the next-hop network address is an address of a router which hosts the number; and a processing module configured to remove the number route information from a route table when the received message is a withdrawn route message.

An embodiment of the invention further provides a number routing device including: a storage module configured to store a number to be distributed; a configuration module configured to extend a dynamic routing protocol by converting the number to be distributed into number route information, adding the number route information into the dynamic routing protocol, and generating an encapsulated message of the dynamic routing protocol; and a transmission module configured to transmit the message of the dynamic routing protocol.

In the foregoing embodiments of the invention, it is proposed to extend an existing dynamic routing protocol, e.g., the MP-BGP, etc., by adding number route information into the dynamic routing protocol; and when routers communicate through a number, automatic distribution of the number between the routers can be performed in the dynamic routing protocol, e.g., the extended MP-BGP, etc., to thereby optimize effectively the structure of a network and improve the efficiency.

DETAILED DESCRIPTION OF THE EMBODIMENTS

The technical solutions according to the invention are further detailed below with reference to the drawings and embodiments.

An underlying idea of the invention is to propose a new method for configuring NLRI with a value taken for an Address Family Identifier (simply AFI) in the MP-BGP to perform a function of automatic routing of an E.164, E.214 and SP number, in the MP-BGP, where the NLRI is configured by configuring the MP_REACH_NLRI and the MP_UNREACH_NLRI. According to the invention, the MP_REACH_NLRI is configured by modifying the existing MP_REACH_NLRI route attribute correspondingly, and the MP_UNREACH_NLRI is configured by modifying the existing MP_UNREACH_NLRI route attribute correspondingly. The MP_REACH_NLRI route attribute, the MP_UNREACH_NLRI route attribute and the NLRL Encoding in the format of an MP-BGP message are described below.

1. Modified Format of an MP-BGP Message 1.1. The MP_REACH_NLRI Route Attribute

The usages of respective fields in the MP_REACH_NLRI attribute have been described as above, and a description will be presented below of differences of the invention from the prior art.

1.11. The Address Family Identifier (Simply AFI)

This field carries the identifier of a connection of a network layer protocol with a network address. At present, this field takes defined values which are specified in the RFC1700 (see the section of Address Family Numbers) as follow:

NUMBER DESCRIPTION

0 Reserved
1 IP (IP version 4)
2 IP6 (IP version 6)
3 NSAP
4 HDLC (8-bit multidrop)
5 BBN 1822
6 802 (includes all 802 media plus Ethernet "canonical format")
7 E.163
8 E.164 (SMDS, Frame Relay, ATM)
9 F.69 (Telex)
10 X.121 (X.25, Frame Relay)
11 IPX
12 Appletalk
13 Decnet IV
14 Banyan Vines
65535 Reserved In order to enable the MP-BGP to support routing of an E.164, E.214 and SP number, corresponding address family numbers shall be determined.

1. For the E.264 protocol, AFI=8 can be adopted from the address family numbers specified in the RFC1700.

2. For the E.214 protocol, AFI=8 can also be adopted due to the similarity of the E.214 in format to the E.164.

3. For an SP code, the authority has ensured that there is neither duplicate SP code throughout an enterprise nor with the E.164, and although no global uniqueness can be achieved, uniqueness can be ensured with different RDs, so AFI=8 can also be adopted.

Of course, whatever value taken for the AFI, which shall be assigned from the Internet Assigned Numbers Authority (simply IRNA), does not influence the essence of the invention.

1.12. The Subsequent Address Family Identifier (Simply SAFI)

The SAFI is used as follows:

| SAFI | 1 and 2 | Assigned. |
| --- | --- | --- |
| SAFI | 3 | Reserved. |
| SAFI | 5 to 63 | Used for the IANA. |
| SAFI | 67 to 127 | Assigned from the IANA on the principle of first come first served. See RFC2434 for specific definitions thereof. |
| SAFI | 0 and 255 | Reserved. |
| SAFI | 128 to 240 | A part therebetween has been kept for private use, and the remaining part thereof has been reclaimed by the IANA, including 130, 131, 135 to 139, and 141 to 240, which nevertheless are reserved to avoid any confliction. |
| SAFI | 241 to 254 | Allowed to be kept for private use and free from being assigned by the IANA. |

Whatever value taken for the SAFI does not influence the invention. As noted according the invention, it is simply required to assign the AFI and the SAFI to indicate routing of an E.164/E.214/SP number. It can take a specific value assigned from the IANA. The existing assigned values of the AFI and the SAFI do not influence the invention. In the present embodiment, AFI=8 and SAFI=1 can be assigned temporarily. However those ordinarily skilled in the art shall appreciate that whatever value taken for the SAFI does not influence the invention but shall be assigned from the IANA.

1.13. The Length of Next Hop Network Address

It is consistent with the specification in the existing MP-BGP.

1.14. The Network Address of Next Hop

This field is variable in length and includes the address of a next router to a destination system. The existing MP-BGP requires that a next-hop Label Switching Router (LSR) address be in the same address format as the address prefix in the NLRI, and in the present embodiment, the IPv4 is adopted for the next-hop LSR address, and a 8-byte RD plus a length-variable E.164 (or E.214 or SP) number is adopted for the address prefix in the NLRI, so they are not in the same format. Therefore the existing MP-BGP is modified in an embodiment of the invention in such a way that for the address family identifier AFI=8 and SAFI=1 in the MP_REACH_NLRI attribute, the next-hop LSR address in the MP-BGP is in the format of an IPv4 address, and then a route with the next-hop LSR address in a different format from that of the address prefix in the NLRI is processed in the MP-BGP.

1.15. The Network Layer Reachability Information

A length-variable area in which the NLRI information of an available route to be announced in the attribute is listed. All of the NLRI is subject to an encoding process as specified in the "NLRI encoding" below.

1.2. The MP_UNREACH_NLRI Attribute

Respective fields are modified as follows 1.21. The Address Family Identifier:

It keeps consistency with the modification to the MP_REACH_NLRI.

1.22. The Subsequent Address Family Identifier

It keeps consistency with the modification to the MP_REACH_NLRI.

1.23 The Withdrawn Route

A length-variable area in which the NLRI of a route to be withdrawn from a service is listed. Each piece of NLRI is subject to an encoding process as specified in the section of "NLRI encoding" below.

1.3. The Network Layer Reachability Information (NLRL) Encoding

Figure 5:
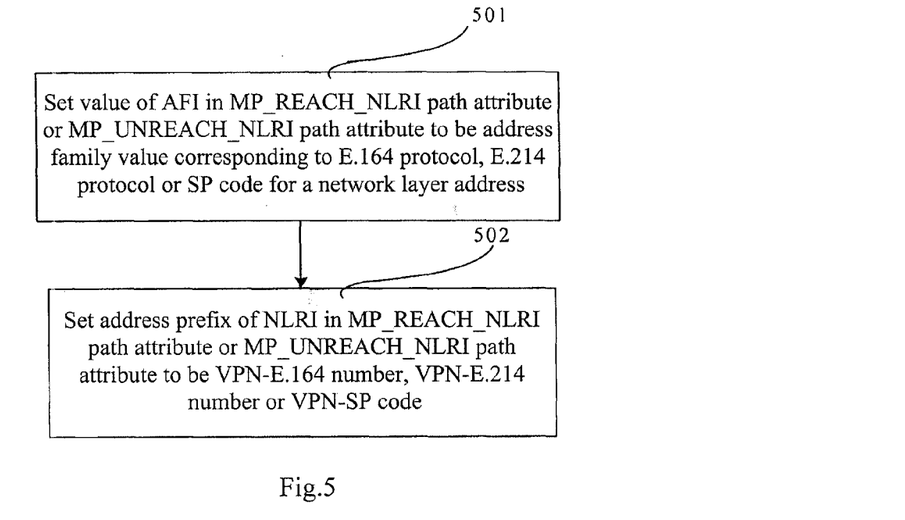
FIG. 5 illustrates a flow chart of an embodiment of encoding NLRI in the MP-BGP in a number automatic routing method according to the invention.

FIG. 5 illustrates a flow chart of an embodiment of encoding NLRI in the MP-BGP in a number automatic routing method according to the invention. As illustrated in FIG. 5, the present embodiment includes the following operations 501 and 502.

The operation 501 is to set the value of the AFI in the MP_REACH_NLRI path attribute or the MP_UN-REACH_NLRI path attribute to be an address family value corresponding to the E.164 protocol, the E.214 protocol or an SP code for a network layer address;

The operation 502 is to set the address prefix of the NLRI in the MP_REACH_NLRI path attribute or the MP_UN-REACH_NLRI path attribute to a VPN-E.164 number, a VPN-E.214 number or a VPN-SP number.

The VPN-E.164 code may include a 8-byte RD and an E.164 number of a network layer address occupying a variable number of bytes; the VPN-E.214 code may include a 8-byte RD and an E.214 number of a network layer address occupying a variable number of bytes; and the VPN-SP number may include a 8-byte RD and a SP number of a network layer address occupying a variable number of bytes.

Taking the E.164 protocol as an example, a router may bear multiple E.164 addressed VPNs, for example, a mobile communication E.164 VPN is configured to set up a correspondence relationship between an E.164 number segment and the IP address of a Mobile Switching Center (MSC), and a color message E.164 VPN is configured to set up a correspondence relationship between an E.164 number segment and the IP address of a color message center. The BGP assumes that each carried address shall be globally unique but E.164 numbers of different VPNs may overlap, so in order to address this issue, the MP-BGP in the present embodiment supports a mechanism through which a possibly overlapping E.164 number is converted into a globally unique address by using a VPN-E.164 address family and deploying an extension to the Multi-Protocol-BGP (MP-BGP).

A space of overlapping addresses proposes a challenge that if the traditional BGP sees two different routes for the same E.164 address prefix (the prefix is assigned to systems in different VPNs) but with the same E.164 number, for example, one E.164 address prefix 1388/4 with a next hop to the IP address "A" of a home multimedia messaging service center of the number segment and the other E.164 address prefix 1388/4 with a next hop to the IP address "B" of an HLR of the number segment, then the BGP processes the prefix as if there were only one route. As a result, there may be a destination unreachable. In order to address this issue, it is required to allow the BGP to disambiguate the prefix, and this function can be supported by defining a VPN-E.164 number address family.

The structure of a VPN-E.164 number address and a support of the MP-BGP for a VPN-E.164 number are detailed below.

1.31. The Structure of a VPN-E.164 Number Address

A VPN-E.164 number address includes a 8-byte Route Distinguisher (simply RD) and a length-variable E.164 number and is structured as follows:

The Type Field: 2 bytes;
The Value Field: 6 bytes; and
The variable: an E.164 number The 8-byte RD means the same as defined in the BGP/MPLS VPN and is consisted of a 2-byte type field and a 6-byte value field. Reference can be made to the RFC4364 [4.2 Encoding of Route Distinguishers] for details thereof.

Such a structure of the RD ensure that a service provider providing a backbone service can generate a unique RD, but such an RD per se makes no particular sense.

1.32. Support of the MP-BGP for a VPN-E.164 Number

After a BGP neighbor relationship is set up between routers, they announce route information respectively to their own BGP neighbors. When the route information is announced, firstly an E.164 number route is converted into the format of a VPN-E.164 number address with an RD specified when E.164 VRF is configured. When the router announces the route information to the BGP peer, each route (MP-BPG route) shall include the following contents:

a. the VPN-E.164 number address of the router (a 8-byte RD plus a length-variable E.164 number address);

b. the IP address of the router per se acts as an MP-BPG next-hop LSR address of the route, and since the existing MP-BGP requires that a next-hop LSR address be in the same address format as the address prefix in the NLRI, the existing MP-BGP is modified in the section 1.14 of the invention, and the MP-BPG next-hop LSR address as referred to in the invention is in the format of an IPv4 address;

c. an export Route Target (RT) including VRF of the route and encapsulated into the "COMMUNITY" attribute in the BGP; and d. possibly the attributes of "ORIGIN" and "AS_PATH" of the route are included.

The structure of the VPN-E.164 number address has been described as above and is encapsulated in the NLRI attribute of the MP_REACH_NLRI after being encoded.

The NLRI is encoded as in the extended multi-protocol BGP, and the AFI field takes the value of 8 (because the network layer protocol associated with the NLRI is still the E.164) to indicate that a VPN-E.164 number address is carried.

Also since an MP-BGP route according to the invention is configured for communication of an upper service of a user, it is not necessary to refer to a VPN route table after a data packet arrives at a router of the receiving party because different services are borne in different protocols over the application layer. Moreover if a label is distributed, then it is not necessarily required to perform end-to-end MPLS between a router of the transmitting party and that of the receiving party because the data packet can not be transmitted from the router of the transmitting party if it is labeled. In view of the foregoing two points, no label is distributed for an E.164 route. Then the SAFI can be set to be 1.

For routing of an E.164 number, routes are aggregated by reducing the number of digits of decimal numbers. Regardless of whether aggregation is made, the data packet can be transmitted from the router of the transmitting party only if the router knows that <a number segment hosted by the receiving party, and the address of the router of the receiving party> are correct. The receiving party distinguishes different services by different upper protocols without referring to the VPN route table for forwarding. Reception of different routes by different VPNs shall be distinguished with an RT value, so the RT value shall be reserved.

In order to support a scenario in which a router can process the same number segment that belongs to different services, the concept of RD in an existing VPN is introduced as depicted in Table 1 to distinguish different services with an RD (the RT in the VPN are also introduced along with the RD).

A function of routing a number segment can also be performed without introducing any RD, but a router will not support a function of processing multiple upper telecommunication services.

TABLE 1

| Number segment route | Next-hop address |
|---|---|
| 1391178 | 10.1.1.1 (the IP address of a home multimedia messaging service center of the number segment of 1391178) |
| 1391178 | 20.1.1.1 (the IP address of an HLR of the number segment of 1391178) |

If the RD is introduced, then the number segment routes in Table 1 will not be duplicate in the BGP route table, and as depicted in Table 2:

TABLE 2

| Number segment route | Next-hop address |
|---|---|
| RD1: 1391178 | 10.1.1.1 (the IP address of a home multimedia messaging service center of the number segment) |
| RD2: 1391178 | 20.1.1.1 (the IP address of an HLR of the number segment) |

Figure 6:
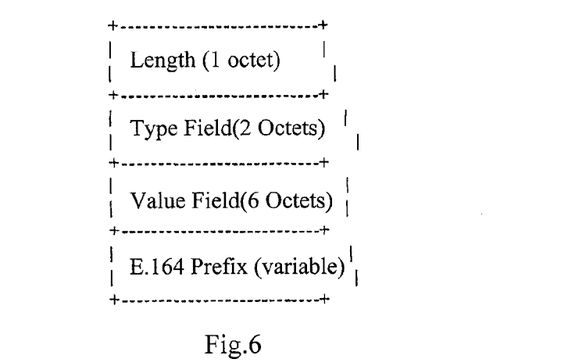
FIG. 6 illustrates a schematic diagram of an embodiment of encoding of NLRI for the E.164 protocol in the MP-BGP in the number automatic routing method according to the invention.

In summary, the format of NLRI encoding is as illustrated in FIG. 6, and the usages and meanings of respective fields are as follows.

The Length: this field indicates the length of an address prefix in bit. If it is all zero, then this indicates a match to any address.

The fields of 'Type" and "Value" of the RD: the 8-byte RD is exactly as defined in the VPN-IPv4.

The E.164 Number Address Prefix (E.164 Prefix): this field includes a number address prefix which is supplemented in bit to a full byte(s) without influencing any true value of the prefix.

An example is described below:

Assumed for an E.164 number address prefix of 861391178978, a BCD compact encoding format is adopted for NLRI encoding by representing a decimal number as 4 bits, and of course, an alternative encoding format can also be adopted. The Type of the RD equals to 2, the ASN in the Value equals to 9808, and the assigned number sub-field equals to 100, so the NLRI is encoded as depicted in Table 3:

TABLE 3

Encoded NLRI Table

| 0 | 7 8 | 15 16 | 23 24 | 31 |
|---|---|---|---|---|
| 1 0 0 0 1 0 0 0 | 0 0 0 0 0 0 0 0 | 0 0 0 0 0 0 1 0 | 0 0 0 0 0 0 0 0 |
| 0 0 0 0 0 0 0 0 | 0 0 1 0 0 1 1 0 | 0 1 0 1 0 0 0 0 | 0 0 0 0 0 0 0 0 |
| 0 1 1 0 0 1 0 0 | 1 0 0 0 0 1 1 0 | 0 0 0 1 0 0 1 1 | 1 0 0 1 0 0 0 1 |
| 0 0 0 1 0 1 1 1 | 1 0 0 0 1 0 0 1 | 0 1 1 1 1 0 0 0 | |

The export Route Target (simply export RT) is encapsulated in the "Community" attribute as defined in the VPN-IPv4, and reference can be made to the RFC4364 for details thereof.

In the MP_UNREACH_NLRI attribute, a "withdrawn" route is encapsulated as in NLRI encoding. All of routes published previously will be withdrawn when a BGP session is terminated.

1.33. The Error Process

It is consistent with the existing MP-BGP.

1.34. The Use of a BGP Capability Advertisement

It is consistent with the existing MP-BGP except for the AFI taking the value of 8 and the SAFI taking the value of 1.

2. An Embodiment of Routing a VPN-E.164 Number

Figure 7:
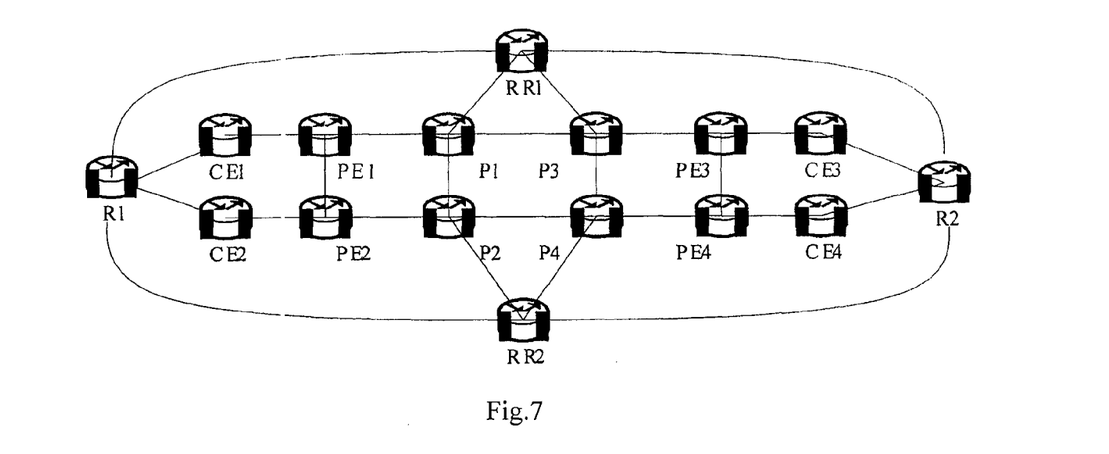
FIG. 7 illustrates a schematic diagram of an embodiment applied to an MPLS/BGP VPN backbone network in the number automatic routing method according to the invention.

FIG. 7 illustrates a schematic diagram of an embodiment applied to an MPLS/BGP VPN backbone network in the number automatic routing method according to the invention. P1-P4 represent operator routers, PE represents a provider edge router, CE represents a customer edge router, and R1 and R2 represent routers complying with the MP-BGP extended according to the invention. RR1 and RR2 represent route reflectors of the R1 and the R2. R1 and R2 are located in the same Autonomous System (AS) domain.

It shall be noted that the extensions to the MP-BPG in the foregoing embodiments of the invention are applicable to any IP network over which the MPLS VPN may or may not be operative.

An extension to the MP-BPG according to the invention can coexist with the BGP-4 and the MP-BGP in a BGP instance of a router without mutual influence. However in view of the performance of the router, it is recommended that an Autonomous System Border Router (ASBR) and a Route Reflector (RR) in the traditional BGP-4 and an ASBR and an RR according to the invention be deployed separately.

2.1. Configured Interface of VPN-E.164 Number Router

There are various possible implementations, for example:

```
R1:
    E.164 vrf VPN100
    rd 100:1
    route-target export 100:1
    route-target import 100:1
    E.164 vrf VPN200
      rd 100:2
      route-target export 100:2
      route-target import 100:2
    interface loopback 100
      ip vrf forwarding VPN100
      ip address 10.10.10.100 255.255.255.252
    interface loopback 200
      ip vrf forwarding VPN200
      ip address 10.10.10.200 255.255.255.252
    router E.164
      address-family E.164 vrf VPN100
      no auto-summary
      network 001
      network 002
      network 003
      network 004
      network 005
      network 006
      network 007
      network 008
      network 009
      network 000
      network 01111
    address-family E.164 vrf VPN200
      no auto-summary
      network 13911178
      network 13800001
      network 13700001
      network 13740001
      network 15700001
      network 15800001
      ............
    router bgp 9808
    /*Normal BGP neighbor*/
    no synchronization
    neighbor 20.20.20.1 remote-as 9808
    neighbor 20.20.20.1 update-source LoopBack0
    /*For a specific operation of each VRF, a route of the VRF is published to the BGP*/
      address-family E.164 vrf VPN100
      redistribute static
        no synchronization
      exit-address-family
      address-family E.164 vrf VPN200
      redistribute static
        no synchronization
      exit-address-family
      /*The normal neighbor can be enabled to pass the vpn E.164 route*/
      address-family vpnE.164
        neighbor 20.20.20.1 activate
      exit-address-family
R2:
    E.164 vrf VPN100
    rd 100:1
      route-target export 100:1
      route-target import 100:1
    E.164 vrf VPN200
      rd 100:2
      route-target export 100:2
      route-target import 100:2
    interface loopback 100
      ip vrf forwarding VPN100
    ip address 20.20.20.100 255.255.255.252
    interface loopback 200
      ip vrf forwarding VPN200
      ip address 20.20.20.200 255.255.255.252
    router E.164
    address-family E.164 vrf VPN100
      no auto-summary
      network 0574
      network 010
      ............
      network 020
    address-family E.164 vrf VPN200
      no auto-summary
      network 1330
      network 1331
      network 1332
      network 1333
      network 1334
      network 1335
      network 1336
      network 1337
      network 1338
      network 131
      network 130
      network 1339
      ...............
    router bgp 9808
    /*Normal BGP neighbor*/
    no synchronization
    neighbor 10.10.10.1 remote-as 9808
    neighbor 10.10.10.1 update-source LoopBack0
    /*For a specific operation of each VRF, a route of the VRF is published to the BGP*/
      address-family E.164 vrf VPN100
      redistribute static
        no synchronization
      exit-address-family
      address-family E.164 vrf VPN200
      redistribute static
        no synchronization
      exit-address-family
      /*The normal neighbor can be enabled to pass the vpn E.164 route*/
      address-family vpnE.164
        neighbor 10.10.10.1 activate
      exit-address-family
```

It is configured similarly to the VPN-IPv4 except for the different address adopted according to the invention from the VPN-IPv4.

2.2. VPN-E.164 Number Route Table

A VPN100 route of the R1 is as depicted in Table 4:

TABLE 4

VPN100 route table of R1

| Route code | Destination number prefix | Length of number | Next-hop address | Aggregated or not |
|---|---|---|---|---|
| S | 000 | 3 | Loopback100 address of R1 | No |
| S | 001 | 3 | Loopback100 address of R1 | No |
| S | 002 | 3 | Loopback100 address of R1 | No |
| S | 003 | 3 | Loopback100 address of R1 | No |
| S | 004 | 3 | Loopback100 address of R1 | No |
| S | 005 | 3 | Loopback100 address of R1 | No |
| S | 006 | 3 | Loopback100 address of R1 | No |
| S | 007 | 3 | Loopback100 address of R1 | No |
| S | 008 | 3 | Loopback100 address of R1 | No |
| S | 009 | 3 | Loopback100 address of R1 | No |
| S | 01111 | 5 | Loopback100 address of R1 | No |
| B | 0574 | 4 | Loopback100 address of R2 | / |
| B | 010 | 3 | Loopback100 address of R2 | / |
| B | 020 | 3 | Loopback100 address of R2 | / |

A VPN200 route of the R1 is as depicted in Table 5:

TABLE 5

VPN200 route table of R1

| Route code | Destination number prefix | Length of number | Next-hop address | Aggregated or not |
|---|---|---|---|---|
| S | 13911178 | 8 | Loopback200 address of R1 | No |
| S | 13800001 | 8 | Loopback200 address of R1 | No |
| S | 13700001 | 8 | Loopback200 address of R1 | No |
| S | 13740001 | 8 | Loopback200 address of R1 | No |
| S | 15700001 | 8 | Loopback200 address of R1 | No |
| S | 15800001 | 8 | Loopback200 address of R1 | No |
| B | 133 | 3 | Loopback200 address of R2 | / |
| B | 130 | 3 | Loopback200 address of R2 | / |
| B | 131 | 3 | Loopback200 address of R2 | / |

A VPN100 route of the R2 is as depicted in Table 6:

TABLE 6

VPN100 route table of R2

| Route code | Destination number prefix | Length of number | Next-hop address | Aggregated or not |
|---|---|---|---|---|
| B | 00 | 2 | Loopback100 address of R1 | / |
| B | 01111 | 5 | Loopback100 address of R1 | / |
| S | 0574 | 4 | Loopback100 address of R2 | No |
| S | 010 | 3 | Loopback100 address of R2 | No |
| S | 020 | 3 | Loopback100 address of R2 | No |

A VPN200 route of the R2 is as depicted in Table 7:

TABLE 7

VPN200 route table of R2

| Route code | Destination number prefix | Length of number | Next-hop address | Aggregated or not |
|---|---|---|---|---|
| B | 13911178 | 8 | Loopback200 address of R1 | / |
| B | 13800001 | 8 | Loopback200 address of R1 | / |
| B | 13700001 | 8 | Loopback200 address of R1 | / |
| B | 13740001 | 8 | Loopback200 address of R1 | / |
| B | 15700001 | 8 | Loopback200 address of R1 | / |

TABLE 7-continued

VPN200 route table of R2

| Route code | Destination number prefix | Length of number | Next-hop address | Aggregated or not |
|---|---|---|---|---|
| B | 15800001 | 8 | Loopback200 address of R1 | / |
| S | 1330 | 4 | Loopback200 address of R2 | No |
| S | 1331 | 4 | Loopback200 address of R2 | No |
| S | 1332 | 4 | Loopback200 address of R2 | No |
| S | 1333 | 4 | Loopback200 address of R2 | No |
| S | 1334 | 4 | Loopback200 address of R2 | No |
| S | 1335 | 4 | Loopback200 address of R2 | No |
| S | 1336 | 4 | Loopback200 address of R2 | No |
| S | 1337 | 4 | Loopback200 address of R2 | No |
| S | 1338 | 4 | Loopback200 address of R2 | No |
| S | 131 | 3 | Loopback200 address of R2 | No |
| S | 130 | 3 | Loopback200 address of R2 | No |
| S | 1339 | 4 | Loopback200 address of R2 | No |

In the route tables in Tables 4 to 7:

The route code: it means the same as in the existing IP route table, where "S" represents a static route and "B" represents the BGP.

The destination number prefix: it means the same as the destination network prefix in the existing IP route table except for an E.164 number stored in the present embodiment and an IP network segment or address stored in the prior art.

The length of number: the length of a decimal number in bit in the field of destination number prefix. It corresponds to the length of a mask in the existing IP route table except for the latter representing the number of significant bits in the network prefix.

The others: they mean the same as in the existing IP route table.

2.3. Details of Operations

Figure 8:
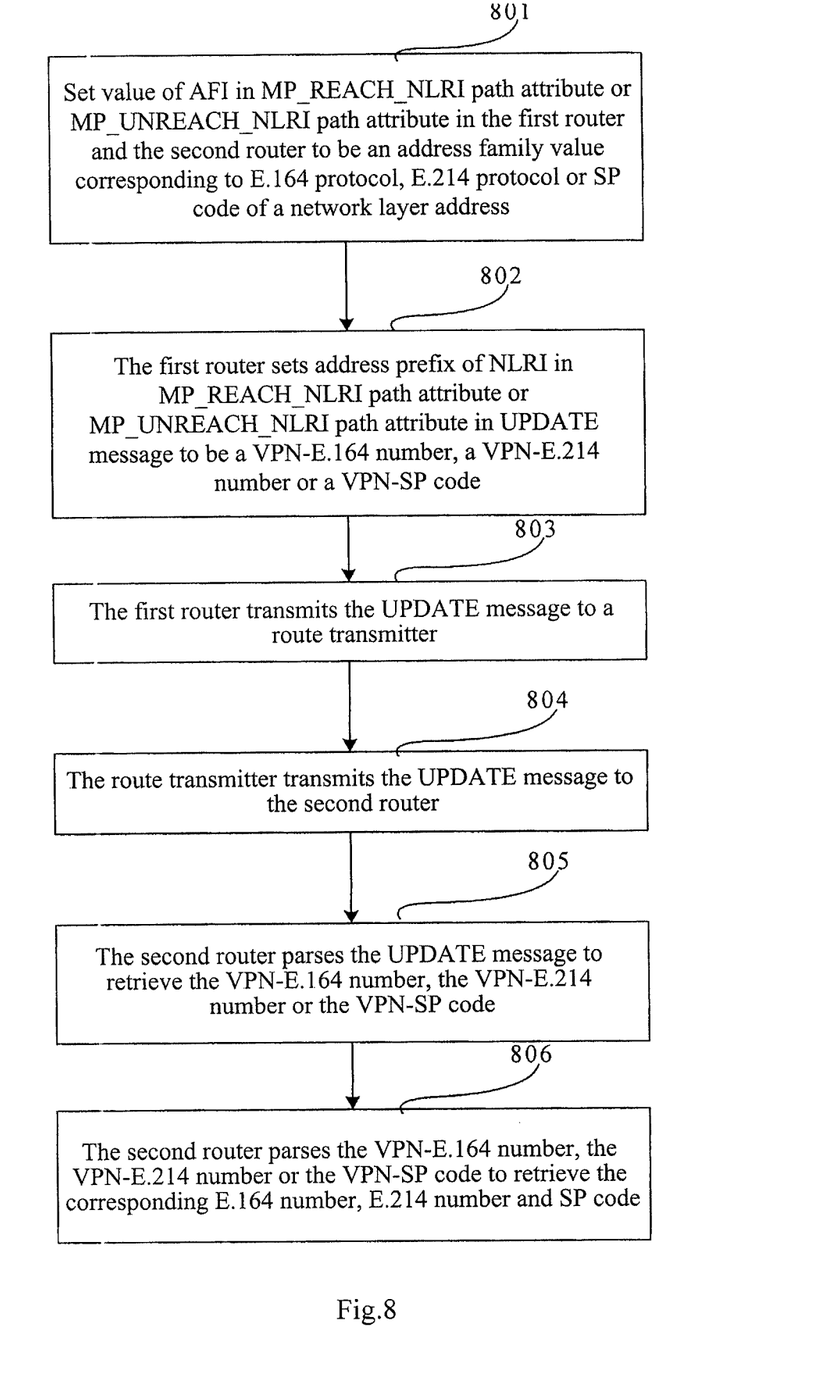
FIG. 8 illustrates a flow chart of an embodiment of the number automatic routing method in the MP-BGP according to the invention.

FIG. 8 illustrates a flow chart of an embodiment of the number automatic routing method in the MP-BGP according to the invention. When a first router communicates with a second router in the E.164 protocol, the E.214 protocol or an SP code, this method includes the following operations 801 to 806.

The operation 801 is to set the value of the AFI in the MP_REACH_NLRI path attribute or the MP_UNREACH_NLRI path attribute in the first router and the second router to be an address family value corresponding to the E.164 protocol, the E.214 protocol or the SP code of a network layer address;

The operation 802 is to set at the first router the address prefix of the NLRI in the MP_REACH_NLRI path attribute or the MP_UNREACH_NLRI path attribute in the UPDATE message to be a VPN-E.164 number, a VPN-E.214 number or a VPN-SP code;

The operation 803 is to transmit the UPDATE message from the first router to a route transmitter;

The operation 804 is to transmit the UPDATE message from the route transmitter to the second router;

The operation 805 is to parse the UPDATE message at the second router to retrieve the VPN-E.164 number, the VPN-E.214 number or the VPN-SP code; and The operation 806 is to parse at the second router the VPN-E.164 number, the VPN-E.214 number or the VPN-SP code to retrieve the corresponding E.164 number, E.214 number and SP code.

The foregoing operations can be divided into two parts: a preliminary configuration task and a route distribution flow.

A BGP/MPLS VPN network in support of routing of an E.164 number is described by way of an example with reference to the network topology in FIG. 7. The CE1-CE4 routers access two differently located VPNs, and the PE1 and the PE2 are connected over an MPLS backbone network. In addition to an MPLS specific Label Switching Path (LSP), a peer relationship is also set up between the PE1 and the PE2 through the MP-BGP to publish a VPN-IPv4 route. An MP-BGP peer relationship extended according to the invention is set up between the R1 and the R2 through reflectors RR1 and RR2 to publish a VPN-E.164 number segment route.

2.31. The Preliminary Configuration Task

The first operation of the configuration task is to configure VRF on the PEs, where the PE1 and the PE2 set up VRF for the respective VPNs with respect to ports via which the CEs are connected;

The second operation of the configuration task involves the BGP, that is, the MP-BGP protocol is configured between the PE1 and the PE2 to ensure proper distribution of a VPN-IPv4 route;

The third operation of the task is to set up an LSP, where the PE1, the PE2 and another operator core router (a Provider Router or a P router) in the MPLS backbone network requests for an LSP in the label Distribution Protocol (LDP) so that an exchange path is set up between the PE1 and the PE2 and all of data packets are forwarded therebetween in the label switching mode of MPLS.

The fourth operation is to configure an Interior Gateway Protocol (IGP) between the CEs and the PEs (typically over an Open Shortest path First (OSPF)) so as to notify the PEs about a route in the VPNs;

The fifth operation is to configure VRF on the R1 and the R2, where the R1 and the R2 set up VRF for the respective VPNs with respect to respective applications to ensure security of information in the VPNs; and The sixth operation of the configuration task involves the BGP, that is, the MP-BGP protocol extended according to the invention is configured between the R1 and the R2 to ensure proper distribution of a VPN-E.164 number route;

2.32. The Route Distribution Flow

After the protocol is well configured, the entire network operates normally, and after the R1 and the R2 are connected, the flow of distributing a VPN-E.164 number route includes route updating and withdrawing flows.

2.321. The Route Updating Flow

1) The R1 set ups a neighbor relationship with the R2 as in the BGP and tests the R2 in the BGP capability announcement process (BGP-CAP) about whether it supports the extension made to the MP-BGP. The capability optional parameter field is configured such that the Capability Code is set to be 1 (indicating a multi-protocol extension capability), the Capability Length is set to be 4, and the Capability value fields include the fields of "AFI", "Res." and "SAFI" in sequence.

The AFI field—an address family identifier (16 bits). The AFI field is encoded in the way of encoding the AFI in the NLRI according to the invention;

The RES. field—a reserved (8-bit) area. It shall be set by the transmitting party as 0 and ignored by the receiving party; and The SAFI field—a subsequent address family identifier (8 bits). It is encoded as preset in the NLRI according to the invention. In order to exchange route information for two specific directions between a pair of BGP speakers, each of the BGP speakers shall announce its support for such a special route to the other one through a capability announcement mechanism;

2) Assumed E.164 number segment routes 000, 001, 002, . . . , 009, 01111 are configured manually at the R1 in the VPN100. It is indicated that these number segments are reachable in the VPN100;

3) The VPN100 puts the number segment routes 000, 001, 002, . . . , 009, 01111 (these routes shall be VPN tagged) into VRF100 preset for the VPN100;

4) In the BGP protocol, the number segment routes 000, 001, 002, . . . , 009, 01111 are fetched from VRF100 and converted into VPN-E.164 routes, which in turn are encapsulated into the MP_REACH_NLRI attribute while encapsulating the RT information into the "Community" attribute. The RT is encapsulated as in the BGP/MPLS VPN, so a repeated description thereof is omitted here;

5) In the BGP protocol, the loopback100 addresses of the R1 are set to be next hops of the VPN-E.164 routes, and it is determined whether aggregation is required, and if so, the operation 6) is performed on the MP_REACH_NLRI attribute of those number segment routes which are not aggregated; otherwise the operation 7) is performed;

6) The MP_REACH_NLRI attribute is populated particularly as follows.

The AFI field: set to be a value assigned from the IANA to the invention.

The SAFI field: set to be a value assigned from the IANA to the invention.

The Length of Next Hop network Address field: set to be 4 indicating that a next-hop network address is the IPv4 and has a length of 4.

The Network Address of Next Hop (variable) field: set to be the loopback100 address 10.10.10.100 of the R1. This value can be modified via the configuration interface, e.g., to an interface address, another loopback address or alike.

The Reserved (1 octet) field: processed as in the existing MP-BGP.

The Length field of the NLRI: set to be 76 and calculated particularly as follows: the 000 number segment is converted into a 12-bit binary number based on BCD coding, and since the 8-byte RD occupies 64 bits, the valid length of the 000 number segment is 76 bits.

The Type field of the NLRI: set to be 2, where the Type of the RD is encoded in the present embodiment as the AS plus the number (reference can be made to the description of the section C in "(21) The structure of an VPN-IPv4 address" in this context for details thereof)

The Value field of the NLRI: the upper 4 bytes are set to be 100 and the lower 2 bytes are set to be 1.

The E.164 Prefix field of the NLRI: set to be the decimal number 000. Particularly with respect to the number length field equal to 3 in the VPN 100 of Table 2, a router takes the first 3 decimal digits 000 from the prefix field of a destination number and converts it into binary 0000, 0000, 0000, 0000 on the principle of supplementing in bit to a full byte(s). The NLRI of the other number segment routes 001, 002, . . . , 009, 01111 is populated similarly to 000, so a repeated description thereof is omitted here.

The populated MP_REACH_NLRI is depicted as follows:

TABLE 8

| | | |
|---|---|---|
| Address Family Identifier (2 octets) | | A value assigned from the IANA to the invention |
| Subsequent Address Family Identifier (1 octet) | | A value assigned from the IANA to the invention |
| Length of Next Hop Network Address (1 octet) | | 4 |
| Network Address of Next Hop (variable) | | 10.10.10.100 (loopback100 of R1) |
| Reserved (1 octet) | | |
| Network Layer Reachability Information (variable) | Length (1 Octet) | 76 |
| | Type Field (2 Octets) | 2 |
| | Value Field (6 Octets) | 100:1 |
| | E.164 Prefix (variable) | 000 (the decimal number segment 000 is compact BCD-encoded and supplemented in bits to full bytes encoded as 2-byte binary: 0000, 0000, 0000, 0000) |
| | Length (1 octet) | 76 |
| | Type Field (2 Octets) | 2 |
| | Value Field (6 Octets) | 100:1 |
| | E.164 Prefix (variable) | 001 (binary: 0000, 0000, 0001, 0000) |
| | ... | ... |
| | Length (1 octet) | 76 |
| | Type Field (2 Octets) | 2 |
| | Value Field (6 Octets) | 100:1 |
| | E.164 Prefix (variable) | 009 (binary: 0000, 0000, 1001, 0000) |
| | Length (1 octet) | 84 |
| | Type Field (2 Octets) | 2 |
| | Value Field (6 Octets) | 100:1 |
| | E.164 Prefix (variable) | 01111 (binary: 0000, 0001, 0001, 0001, 0001, 0000) |

7) If the R1 is configured with a command to aggregate number segment routes, then the R1 reduces the number of digits in the existing algorithm of reducing the number of digits of a decimal number segment, which is a recursive algorithm to aggregate number segment routes by reducing the number of digits of the number segments. In the present embodiment, all of the number segments 001 to 009 are present, so they can be reduced in digit into the number segment 00. Aggregation of the number segments can reduce the number of number segment routes to improve the efficiency of updating the number segment routes in the BGP. The MP_REACH_NLRI is populated similarly to the operation 6) except for the reduced number of number segment routes. The populated MP_REACH_NLRI is depicted as follows:

TABLE 9

| | | |
|---|---|---|
| Address Family Identifier (2 octets) | | A value assigned from the IANA to the invention |
| Subsequent Address Family Identifier (1 octet) | | A value assigned from the IANA to the invention |
| Length of Next Hop Network Address (1 octet) | | 4 |
| Network Address of Next Hop (variable) | | 10.10.10.100 (loopback100 of R1) |
| Reserved (1 octet) | | |
| Network Layer Reachability Information (variable) | Length (1 Octet) | 76 |
| | Type Field (2 Octets) | 2 |
| | Value Field (6 Octets) | 100:1 |
| | E.164 Prefix (variable) | 00 (binary: 0000, 0000, 0000, 0000) |
| | Length (1 octet) | 84 |
| | Type Field (2 Octets) | 2 |
| | Value Field (6 Octets) | 100:1 |
| | E.164 Prefix (variable) | 01111 (binary: 0000, 0001, 0001, 0001, 0001, 0000) |

8) The R1 transmits the BGP UPDATE message to the route reflectors RR1 and RR2 in the TCP protocol, and the RR1 and the RR2 reflect the BGP UPDATE message to the R2. The process of transporting this message over CE->PE->P-PE-CE complies with the existing transport over the GP-MPLS VPN, so a repeated description thereof is omitted in the present embodiment;

9) If CE->PE->P-PE-CE involves a normal IP network, then the BGP UPDATE message can be forwarded as an IP packet. This process is known in the prior art, so a repeated description thereof is omitted in the present embodiment;

10) For the sake of simplicity, a description of a process at the R2 upon reception of the MP-BGP UPDAE message from the R1 is presented taking processing of the MP_REACH_NLRI in the operation 7) as an example: upon reception of the MP_REACH_NLRI as in the existing MP-BGP, the R2 can know from the fields of AFI and SAFI that the MP_REACH_NLRI attribute has been extended as in the foregoing embodiment and thus perform the operation 11;

11) The R2 retrieves the next-hop address from the MP_REACH_NLRI as in the MP-BGP and retrieves RD=100:1 from the Type field (2 Octets) and the Value field (6 Octets) of the NLRI. The Length field of the NLRI equal to 72 bits minus the 64-bit (8-byte) RD can result in the E.164 prefix length of 8 bits, and the 8-bit binary value 0000000 following the Value field is fetched and converted into the decimal system by being compact decimal BCD-encoded, thereby resulting in the number segment route 00. The 8-bit E.164 prefix length can be converted into decimal 2 by being compact decimal BCD-encoded. Alike the number segment route 01111 can be retrieved. In the present embodiment, the R2 receives only the number segment routes 00 and 01111 published from the R1 and therefore puts them as optimal routes into the BGP route table as depicted in Table 10. Assumed the R2 also receives the number segment routes 00 and 01111 published from another router, e.g., the R3, at this time the R2 selects optimal one of the routes as in the operation of deciding a preferred route in the existing BGP and puts it in the BGP route table.

TABLE 10

| Route code | Destination number prefix | Length of number | Next-hop address | Aggregated or not |
|---|---|---|---|---|
| B | 00 | 2 | 10.10.10.100 (loopback100 address of R1) | / |
| B | 01111 | 5 | 10.10.10.100 (loopback100 address of R1) | / |

12) The R2 compares the Import RTs of the respective VPNs of the R2 with the Export RT attributes of the number segment routes 00 and 01111 and puts the number segment routes 00 and 01111 from the BGP route table into the route table of the VRF100. The VPN100 route table of the R2 is as depicted in Table 6.

2.322 The Route Withdrawing Flow

As in the existing MP-BGP, the invention also withdraws a route through the MP_UNREACH_NLRI attribute, and the NLRI thereof is populated in the same way as the MP_REACH_NLRI attribute.

A description is presented taking the R1 withdrawing the number segment routes 00 and 01111 as an example:

① Firstly the R1 is reduced in configuration;

② The R1 composes the Withdrawn message with the MP_UNREACH_NLRI attribute by encapsulating therein respective fields in substantially the same way as the MP_REACH_NLRI, so a repeated description thereof is omitted here. The MP_UNREACH_NLRI attribute is as depicted in Table 11:

TABLE 11

| Address Family Identifier (2 octets) | | A value assigned from the IANA to the invention |
|---|---|---|
| Subsequent Address Family Identifier (1 octet) | | A value assigned from the IANA to the invention |
| Withdrawn Routes (variable) | Length (1 Octet) | 72 |
| | Type Field (2 Octets) | 2 |
| | Value Field (6 Octets) | 100:1 |
| | E.164 Prefix (variable) | 00 (binary: 0000, 0000) |
| | Length (1 octet) | 84 |
| | Type Field (2 Octets) | 2 |
| | Value Field (6 Octets) | 100:1 |
| | E.164 Prefix (variable) | 01111 (binary: 0000, 0001, 0001, 0001, 0001, 0000) |

③ The R1 encapsulates the MP_UNREACH_NLRI into a BGP message transmitted to the R2 as in the existing MP-BGP.

④ The R2 de-encapsulates the BGP message into the number segment routes 00 and 01111 in the similar way that the MP_REACH_NLRI attribute is de-encapsulated.

⑤ The R2 removes the number segment routes 00 and 01111 from the BGP route table, and the R2 removes the routes in VPN as in the existing BGP.

To this end, an upper service can be communicated over an E.164 number segment route in the VPN100. A route distribution process in the VPN200 is similar thereto, so a repeated description thereof is omitted here.

2.33 A Flow of Forwarding a Service Message

By way of an example, a flow of making a BICC call to 02010086 in the R1 includes the following operations:

1. the R1 searches the route table of the VPN100 for the "loopback100" address of the R2 as a next-hop address of the service on the principle of a longest match;

2. the R1 BICC-encapsulates it into an IP packet by filling the a "loopback100" address of the R2 in the destination IP address;

3. the data packet is transported to the R2 over an intermediate network;

4. the R2 de-encapsulates it in the BICC/SCTP/IP;

5. the R2 performs some upper processes and composes a BICC response packet;

6. the R2 searches the route table of the VPN100 for the "loopback100" address of the R1 in response to a caller number and fills it into the destination IP address;

7. the data packet is returned to the R1 over the intermediate network; and 8. the R1 de-encapsulates it in the BICC/SCTP/IP.

Figure 9:
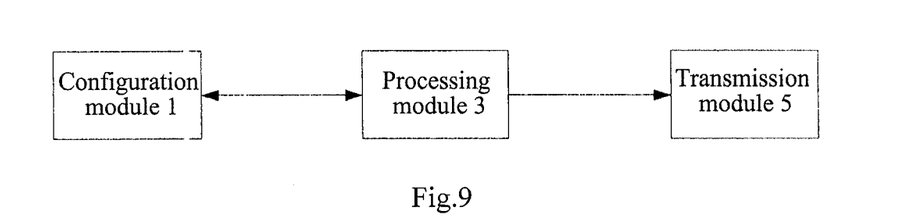
FIG. 9 illustrates a schematic diagram of an embodiment of a router according to the invention.

FIG. 9 illustrates a schematic diagram of an embodiment of a router according to the invention. As illustrated in FIG. 9, the present embodiment includes:

a configuration module 1 configured to add number route information into a dynamic routing protocol (reference can be made to the relevant descriptions of the foregoing method embodiments for details thereof), for example, by setting the value of the AFI in the MP_REACH_NLRI path attribute or the MP_UNREACH_NLRI path attribute to be an E.164 number, an E.214 number or an SP code of a network layer address and setting the address prefix of the NLRI in the MP_REACH_NLRI path attribute or the MP_UNREACH_NLRI path attribute to be a VPN-E.164 number, a VPN-E.214 number, a VPN-SP code, etc;

a processing module 3 configured to convert a number into number route information and to add the number route information into a message of the dynamic routing protocol; and a transmission module 5 configured to transmit the message to a reflector.

Particularly, the processing module 3 may further include: a detection sub-module configured to test in a capability announcement process of the dynamic routing protocol whether a receiving party supports automatic routing of the number; and an execution sub-module configured to convert the number into the number route information and add the number route information into the message of the dynamic routing protocol when a result of the test indicates a support of automatic routing of the number.

The router in the present embodiment may be applied particularly as the R1 in FIG. 7 by setting the MP_REACH_NLRI path attribute or the MP_UNREACH_NLRI path attribute and supporting routing of an E.164 number, an E.214 number, an SP code, etc.

Figure 10:
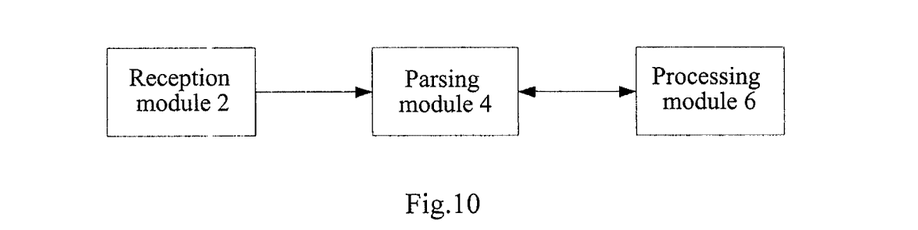
FIG. 10 illustrates a schematic diagram of an embodiment of another router according to the invention.

FIG. 10 illustrates a schematic diagram of an embodiment of another router according to the invention. As illustrated in FIG. 10, the present embodiment includes:

a reception module 2 configured to receive a message of a dynamic routing protocol;

a parsing module 4 configured to parse a received message of the dynamic routing protocol to retrieve number route information and further a route of a number when automatic routing of the number is supported; and a processing module 6 configured to remove the number route information from a route table when the received message is a withdrawn route message.

The router in the present embodiment may be applied particularly as the R2 in FIG. 7 by parsing a message with the MP_REACH_NLRI path attribute or the MP_UNREACH_NLRI path attribute to retrieve a route of an E.164 number, an E.214 number, an SP code, etc., or removing the corresponding number route from a route table.

Figure 11:
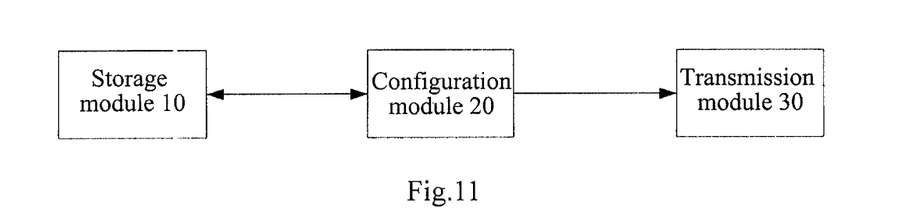
FIG. 11 illustrates a schematic diagram of an embodiment of a number routing device according to the invention.

FIG. 11 illustrates a schematic diagram of an embodiment of a number routing device according to the invention. As illustrated in FIG. 11, the present embodiment includes:

a storage module 10 configured to store a number for distribution;

a configuration module 20 configured to extend a dynamic routing protocol, to convert the number for distribution into number route information, to add the number route information into the dynamic routing protocol, and to generate a message of the dynamic routing protocol through encapsulation; and a transmission module 30 configured to transmit the message of the dynamic routing protocol.

Particularly, the configuration module 20 may include:

an attribute sub-module configured to add new values taken respectively for the AFI and the SAFI in the MP_REACH_NLRI path attribute or the MP_UNREACH_NLRI path attribute to indicate that route information carried in the NLRI is number route information;

a prefix sub-module configured to set the address prefix of the NLRI in the MP_REACH_NLRI path attribute or the MP_UNREACH_NLRI path attribute to be the number for distribution; and a generation sub-module configured to generate a message corresponding to the extended Border Gateway Protocol MP-BGP from the path attribute in the attribute sub-module and the prefix sub-module.

Reference can be made to the foregoing respective method embodiments for details of how to encapsulating the number information in the MP-BGP, for example, as mentioned previously regarding "1 the modification to the format of an MP-BGP message", and "2 the specific implementation of routing a VPN-E.164 number". The configuration module can further include an identification sub-module configured to distinguish different upper services to which the same number belongs to by adding a Route Distinguisher (RD) in the MP-BGP when the same number belongs to different next-hop service addresses. With the introduced Route Distinguisher RD, the same number segment route is not duplicated in BGP routes, and reference can be made to Tables 1 and 2 for details thereof.

In summary, the foregoing respective embodiments of the invention propose a solution of extending the existing MP-BPG to perform automatic routing and distribution of a number, e.g., an E.164 number, an E.214 number, an SP code, etc., by carrying number route information in the MP-BPG protocol so that the extended MP-BGP protocol supports routing of an E.164 number, an E.214 number, an SP code, etc., to thereby perform automatic distribution of the number between routers.

Lastly, it shall be noted that the foregoing embodiments are merely intended to illustrate but not limit the technical solutions of the invention; and although the invention has been detailed with reference to the foregoing embodiments, those skilled in the art shall appreciate that they still can modify the technical solutions recited in the foregoing respective embodiments or equivalently substitute a part of technical features therein and these modifications or substitutions will not make the essence of the corresponding technical solution depart from the scope of the invention.

The invention claimed is:

1. A method for automatic routing of a number, comprising:

converting the number to be distributed into number route information and adding the number route information into a dynamic routing protocol, wherein the dynamic routing protocol is a MultiProtocol-Border Gateway Protocol (MP-BGP) defined in standards of RFC2858 and RFC4760, and the number route information comprises a corresponding relationship between the number to be distributed and a next-hop network address, and wherein the next-hop network address is an address of a router which hosts the number to be distributed;

generating a message of the dynamic routing protocol from the number route information; and transmitting the message of the dynamic routing protocol over an IP network and distributing the number route information in the message of the dynamic routing protocol over the IP network, wherein the adding the number route information into the dynamic routing protocol comprises:

adding new values taken respectively for Address Family Identifier (AFI) and Subsequent Address Family Identifier (SAFI) in an MP_REACH_NLRI path attribute or an MP_UNREACH_NLRI path attribute to indicate that an address prefix carried in Network layer Reachability Information (NLRI) in the MP_REACH_NLRI path attribute or the MP_UNREACH_NLRI path is the number to be distributed.

2. The method of claim 1, wherein the AFI=8 and the SAFI=1.

3. The method of claim 1, wherein the adding the number route information into the dynamic routing protocol further comprises:

setting the address prefix of the NLRI in the MP_REACH_NLRI path attribute or the MP_UNREACH_NLRI path attribute to be the number to be distributed.

4. The method of claim 1, further comprising:

adding a Route Distinguisher (RD) in the MP-BGP to distinguish different upper services to which the same number belongs, when the same number belongs to different next-hop service addresses.

5. The method of claim 1, wherein a next-hop Label Switched Router (LSR) address in the MP-BGP is in a different format from an address prefix in NLRI in the MP-BGP.

6. The method of claim 5, wherein the next-hop LSR address is in the IPv4 format, and the address prefix in the NLRI includes a 8-byte RD and a number in an E.164 protocol with a publication date of May 1, 1997, a number in an E.214 protocol with a publication date of Feb. 1, 2005 or a Service Provider (SP) code of a network layer address occupying a variable number of bytes.

7. A method for updating a route, wherein a first router communicates with a second router through a number route, the method comprising:

converting at the first router a number into number route information and adding the number route information into a dynamic routing protocol, wherein the dynamic routing protocol is a MultiProtocol-Border Gateway Protocol (MP-BGP) defined in standards of RFC2858 and RFC4760, and the number route information comprises a corresponding relationship between the number and a next-hop network address, and wherein the next-hop network address is an address of a router which hosts the number;

transmitting at the first router a message of the dynamic routing protocol comprising the number route information over an IP network to the second router; and parsing at the second router the message of the dynamic routing protocol to retrieve the number route information and the route corresponding to the number;

wherein the adding the number route information into the dynamic routing protocol comprises:

adding new values taken respectively for Address Family Identifier (AFI) and Subsequent Address Family Identifier (SAFI) in an MP_REACH_NLRI path attribute or an MP_UNREACH_NLRI path attribute to indicate that an address prefix carried in Network Layer Reachability Information (NLRI) in the MP_REACH_NLRI path attribute or the MP_UNREACH_NLRI path is the number to be distributed.

8. The method of claim 7, wherein the first router and the second router test in a Border Gateway Protocol (BGP) capability announcement process whether the MP-BGP supports automatic routing of the number, and the first router converts the number into the number route information when a result of the test indicates a support of routing of the number.

9. The method of claim 7, further comprising:
configuring the dynamic routing protocol in the first router and the second router to support routing of the number by:
setting a value of the Address Family Identifier (AFI) in the MP_REACH_NLRI path attribute or the MP_UNREACH_NLRI path attribute to be an address family value corresponding to an E.164 protocol with a publication date of May 1, 1997, an E.214 protocol with a publication date of Feb. 1, 2005 or a Service Provider (SP) code of a network layer address.

10. The method of claim 7, further comprising:
configuring the next-hop network address to be an interface address or a "loopback" address of the router which hosts the number for the MP_REACH_NLRI path attribute for which no number route is aggregated.

11. The method of claim 7, further comprising:
performing a reduction in the number of digits in a recursive algorithm of reducing the number of digits of a decimal number for the MP_REACH_NLRI path attribute for which number routes are aggregated.

12. A method for withdrawing a route, comprising:
generating at a first router a withdrawn route message of a dynamic routing protocol comprising number route information, wherein the dynamic routing protocol is a MultiProtocol-Border Gateway Protocol (MP-BGP) defined in standards of RFC2858 and RFC4760, and the number route information comprises a corresponding relationship between a number and a next-hop network address, and wherein the next-hop network address is an address of a router which hosts the number;
transmitting at the first router the withdrawn route message over an IP network to a second router; and
receiving and parsing at the second router the withdrawn route message to retrieve the number route information and removing the number route information from a route table in the second router,
wherein new values taken respectively for Address Family Identifier (AFI) and Subsequent Address Family Identifier (SAFI) in an MP_REACH_NLRI path attribute or an MP_UNREACH_NLRI path attribute in the dynamic routing protocol are added to indicate that an address prefix carried in Network Layer Reachability Information (NLRI) in the MP_REACH_NLRI path attribute or the MP_UNREACH_NLRI path is the number to be distributed.

13. A router, comprising a storage medium storing a computer program, wherein the computer program is executed to implement:
a configuration module configured to add number route information into a dynamic routing protocol, wherein the dynamic routing protocol is a MultiProtocol-Border Gateway Protocol (MP-BGP) defined in standards of RFC2858 and RFC4760, and the number route information comprises a corresponding relationship between a number and a next-hop network address, and wherein the next-hop network address is an address of the router which hosts the number;
a processing module configured to convert the number into the number route information and to add the number route information into a message of the dynamic routing protocol; and
a transmission module configured to transmit the message to a reflector
wherein the configuration module is configured to add the number route information into the dynamic routing protocol by:
adding new values taken respectively for Address Family Identifier (AFI) and Subsequent Address Family Identifier (SAFI) in an MP_REACH_NLRI path attribute or an MP_UNREACH_NLRI path attribute to indicate that an address prefix carried in Network Layer Reachability Information (NLRI) in the MP_REACH_NLRI path attribute or the MP_UNREACH_NLRI path is the number to be distributed.

14. The router of claim 13, wherein the processing module comprises:
a detection sub-module configured to test in a capability announcement process of the dynamic routing protocol whether a receiving party supports automatic routing of the number; and
an execution sub-module configured to convert the number into the number route information and add the number route information into the message of the dynamic routing protocol when a result of the test indicates a support of automatic routing of the number.

15. A router, comprising a storage medium storing a computer program, wherein the computer program is executed to implement:
a reception module configured to receive a message of a dynamic routing protocol, wherein the dynamic routing protocol is a MultiProtocol-Border Gateway Protocol (MP-BGP) defined in standards of RFC2858 and RFC4760, and new values taken respectively for Address Family Identifier (AFI) and Subsequent Address Family Identifier (SAFI) in an MP_REACH_NLRI path attribute or an MP_UNREACH_NLRI path attribute in the dynamic routing protocol are added to indicate that an address prefix carried in Network Layer Reachability Information (NLRI) in the MP_REACH_NLRI path attribute or the MP_UNREACH_NLRI path is a number to be distributed;
a parsing module configured to parse a received message of the dynamic routing protocol to retrieve number route information and further a route of a number, wherein the number route information comprises a corresponding relationship between the number and a next-hop network address, and wherein the next-hop network address is an address of the router which hosts the number; and
a processing module configured to remove the number route information from a route table when the received message is a withdrawn route message.

16. A number routing device, comprising a storage medium storing a computer program, wherein the computer program is executed to implement:
a storage module configured to store a number to be distributed;

a configuration module configured to extend a dynamic routing protocol by converting the number to be distributed into number route information, adding the number route information into the dynamic routing protocol, and generating an encapsulated message of the dynamic routing protocol, wherein the dynamic routing protocol is a MultiProtocol-Border Gateway Protocol (MP-BGP) defined in standards of RFC2858 and RFC4760, and the number route information comprises a corresponding relationship between the number to be distributed and a next-hop network address, and wherein the next-hop network address is an address of a router which hosts the number to be distributed; and a transmission module configured to transmit the encapsulated message of the dynamic routing protocol, wherein the configuration module comprises:

an attribute sub-module configured to add new values taken respectively for Address Family Identifier (AFI) and Subsequent Address Family Identifier (SAFI) in an MP_REACH_NLRI path attribute or an MP_UNREACH_NLRI path attribute to indicate that an address prefix carried in Network Layer Reachability Information (NLRI) in the MP_REACH_NLRI path attribute or the MP_UNREACH_NLRI path is the number to be distributed.

17. The device of claim 16, wherein the configuration module further comprises:

a prefix sub-module configured to set the address prefix of the NLRI in the MP_REACH_NLRI path attribute or the MP_UNREACH_NLRI path attribute to be the number to be distributed; and a generation sub-module configured to generate a message corresponding to the MP-BGP from the MP_REACH_NLRI path attribute or the MP_UNREACH_NLRI path attribute in the attribute sub-module and the prefix sub-module.

18. The device of claim 17, wherein the configuration module further comprises:

an identification sub-module configured to distinguish different upper services to which the same number belongs by adding a Route Distinguisher (RD) in the MP-BGP when the same number belongs to different next-hop service addresses.

* * * * *